United States Patent
Yang

(10) Patent No.: US 9,654,051 B2
(45) Date of Patent: May 16, 2017

(54) CONTROL CIRCUIT FOR CONTROLLING COOLING FAN OF DATA CENTER

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Meng-Liang Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/804,881

(22) Filed: Jul. 21, 2015

(65) Prior Publication Data
US 2017/0025982 A1   Jan. 26, 2017

(51) Int. Cl.
*G05B 5/00* (2006.01)
*H02H 7/08* (2006.01)
*H02P 1/04* (2006.01)
*H02P 3/00* (2006.01)
*H02P 31/00* (2006.01)

(52) U.S. Cl.
CPC .................................. *H02P 31/00* (2013.01)

(58) Field of Classification Search
CPC ........................................................ H02P 31/00

USPC ........................................................ 318/461
See application file for complete search history.

(56) References Cited

U.S. PATENT DOCUMENTS

| 6,014,611 A * | 1/2000 | Arai ........................ G06F 1/206 702/132 |
| 6,259,172 B1 * | 7/2001 | Lee ......................... G06F 1/206 307/116 |
| 6,428,282 B1 * | 8/2002 | Langley ................ F04D 27/004 417/2 |
| 7,908,468 B2 * | 3/2011 | Chang ................... G06F 1/3287 713/1 |
| 2005/0030171 A1 * | 2/2005 | Liu ........................ G06F 1/206 340/500 |
| 2009/0204270 A1 * | 8/2009 | Garcia ............... G05D 23/1934 700/300 |
| 2012/0194115 A1 * | 8/2012 | Hu ........................... H02P 7/06 318/461 |

* cited by examiner

*Primary Examiner* — Erick Glass
(74) *Attorney, Agent, or Firm* — Steven Reiss

(57) ABSTRACT

A control circuit for controlling a cooling fan is defined in a data center. The control circuit includes a cooling fan, a controller, a switch unit, and a control unit. The controller is configured to generate a first pulse width modulation (PWM) signal for controlling the cooling fan to rotate at a first speed and the control unit is configured to generate a second PWM signal for controlling the cooling fan to rotate at a second speed. The switch unit is configured to output the first PWM signal to the cooling fan when the data center is in an active mode and configured to output the second PWM signal to the cooling fan when the data center is in a standby mode.

8 Claims, 1 Drawing Sheet

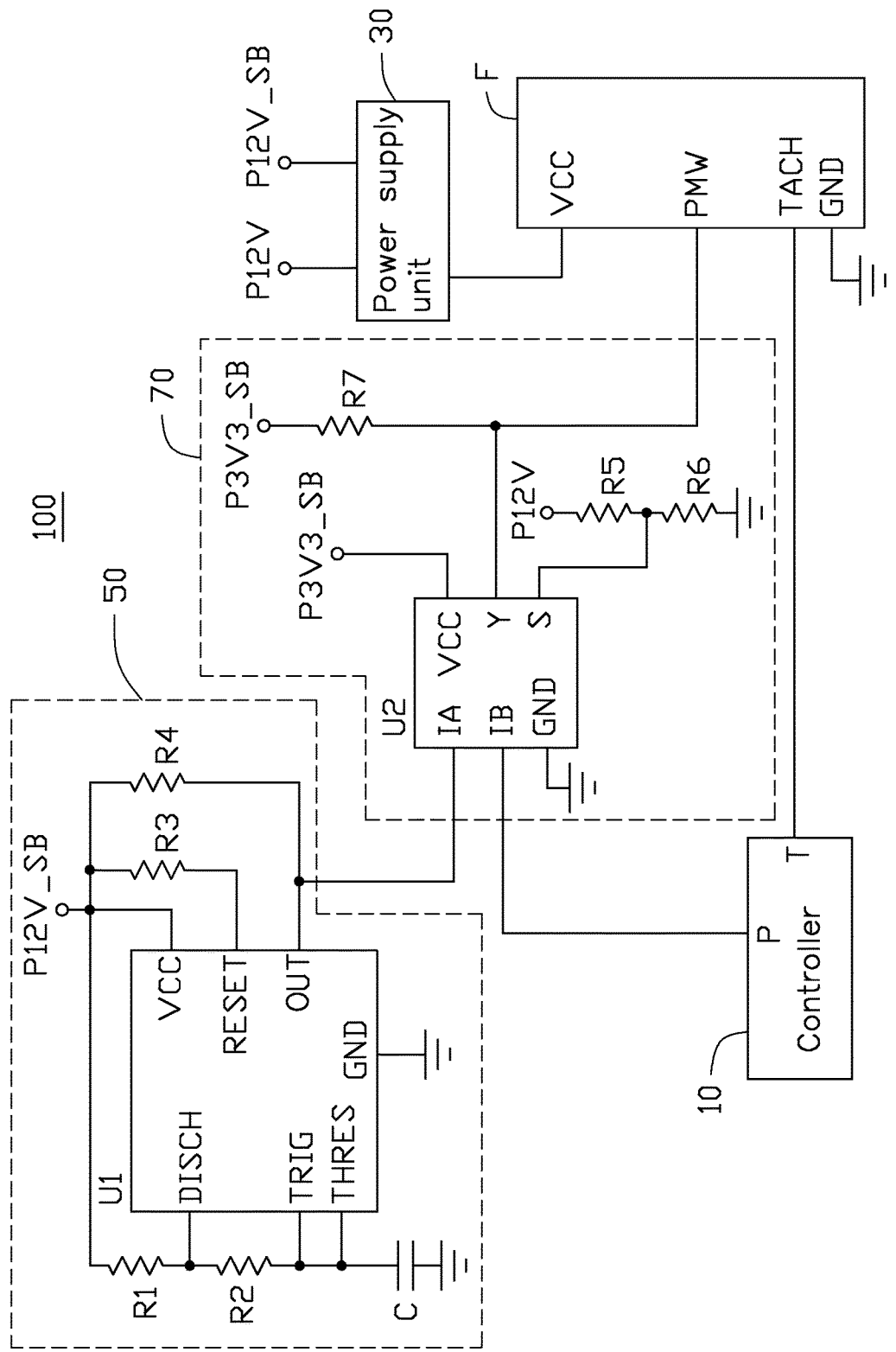

CONTROL CIRCUIT FOR CONTROLLING COOLING FAN OF DATA CENTER

FIELD

The subject matter herein generally relates to air cooling technologies for computer systems, and particularly to, a control circuit for controlling a cooling fan of a data center.

BACKGROUND

Cooling fans of a data center are powered by a standby power supply instead of a system power supply, when the data center is switched to a standby state. If the cooling fans are running at normal speed at the moment of switch, a large operation current could damage the data center.

BRIEF DESCRIPTION OF THE DRAWINGS

Implementations of the present technology will now be described, by way of example only, with reference to the attached figures.

The FIGURE is a circuit diagram of an example embodiment of a control circuit for controlling a cooling fan of a data center.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a control circuit 100.

The FIGURE illustrates an embodiment of the control circuit 100 positioned in a data center (not shown). The control circuit 100 can comprise a cooling fan F, a controller 10, a power supply unit 30, a control unit 50, and a switch unit 70.

The power supply unit 30 is coupled to a power pin VCC of the cooling fan F. The cooling fan F is also coupled to a system power supply P12V and a standby power supply P12V_SB. The system power supply P12V supplies power to the cooling fan F through the power supply unit 30 when the data center is in an active mode. The standby power supply P12V_SB supplies power to the cooling fan F through the power supply unit 30 when the data center is in a standby mode.

The controller 10 is configured to generate a first pulse width modulation (PWM) signal having a duty cycle representative of a real-time temperature of the data center, and output the first PWM signal via a signal output pin P for controlling a rotation speed of the cooling fan F. The signal output pin P of the controller 10 is coupled to a control pin PWM of the cooling fan F through the switch unit 70. A detecting pin T of the controller 10 is coupled to a feedback pin TACH of the cooling fan F for detecting the rotation speed of the cooling fan F.

The control unit 50 can comprise a timer U1, resistors R1-R4, and a capacitor C. A power pin VCC of the timer U1 is coupled to the standby power supply P12V_SB. A discharge pin DISCH of the timer U1 is coupled the standby power supply P12V_SB through the resistor R1. A trigger pin TRIG and a threshold pin THRES of the timer U1 are coupled the discharge pin DISCH of the timer U1 through the resistor R2. The threshold pin THRES of the timer U1 is grounded through the capacitor C. A ground pin GND of the timer U1 is grounded. A reset pin RESET of the timer U1 is coupled to the standby power supply P12V_SB through the resistor R3. An output pin OUT of the timer U1 is coupled to the standby power supply P12V_SB through the resistor R4. The output pin OUT of the timer U1 is also coupled to the control pin PWM of the cooling fan F through the switch unit 70, to output a second PWM signal to the cooling fan F according to charge time and discharge time of the capacitor C, thereby controlling the rotation speed of the cooling fan F.

The switch unit 70 can comprise a switcher U2 and resistors R5-R7. A first input pin IA of the switcher U2 is coupled to the output pin OUT of the timer U1 for receiving the second PWM signal. A second input pin IB of the switcher U2 is coupled to the signal output pin P of the controller 10 for receiving the first PWM signal. A ground pin GND of the switcher U2 is grounded. A power pin VCC of the switcher U2 is coupled to a standby power supply P3V3_SB. A selection pin S of the switcher U2 is coupled to the system power supply P12V through the resistor R5 and is grounded through the resistor R6. An output pin Y of the switcher U2 is coupled to the standby power supply P3V3_SB through the resistor R7 and coupled to the control pin PWM of the cooling fan F.

In use, when the data center is in the active mode, the system power supply P12V supplies power to the cooling fan F through the power supply unit 30. The first PWM signal is received by the second input pin IB of the switcher U2 and the second PWM signal is received by the first input pin IA of the switcher U2. The selection pin S of the switcher U2 is at a high level, and the switcher U2 controls the output pin Y of the switcher U2 coupled to the second input pin IB of the switcher U2. The first PWM signal is received by the control pin PWM of the cooling fan F to keep the cooling fan F rotating at a first speed.

When the data center is in the standby mode, the selection pin S of the switcher U2 is at a low level, and the switcher U2 controls the output pin Y of the switcher U2 coupled to the first input pin IA of the switcher U2. The second PWM signal is received by the control pin PWM of the cooling fan F to keep the cooling fan F rotating at a second speed. In at least one embodiment, the second speed is less than the first speed. Thereby, a current of the cooling fan F which rotates at the second speed is less than a current of the cooling fan F which rotates at the first speed.

The embodiment shown and described above is only example. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A control circuit comprising:
   a cooling fan configured to cool a data center;
   a power supply unit;
   a controller configured to generate a first pulse width modulation (PWM) signal to control the cooling fan to rotate at a first speed;
   a control unit configured to generate a second PWM signal to control the cooling fan to rotate at a second speed, wherein the second speed is less than the first speed; and
   a switch unit coupled to the controller, the control unit and the cooling fan, the switch unit configured to output the first PWM signal to the cooling fan in event the data center is in an active mode and to output the second PWM signal to the cooling fan in event the data center is in a standby mode;
   wherein the power supply unit is coupled to a power pin of the cooling fan, the power supply unit is also coupled to a first standby power supply and a system power supply, the system power supply is configured to supply power to the cooling fan through the power supply unit when the data center is in the active mode, and the first standby power supply is configured to supply power to the cooling fan through the power supply unit when the data center is in a standby mode.

2. The control circuit of claim 1, wherein the control unit comprises a timer, first to fourth resistors, and a capacitor, a power pin of the timer is coupled to the first standby power supply, a discharge pin of the timer is coupled the first standby power supply through the first resistor, a trigger pin and a threshold pin of the timer are coupled the discharge pin of the timer through the second resistor, the threshold pin of the timer is grounded through the capacitor, a ground pin of the timer is grounded, a reset pin of the timer is coupled to the first standby power supply through the third resistor, an output pin of the timer is coupled to the first standby power supply through the fourth resistor, the output pin of the timer is also coupled to a control pin of the cooling fan through the switch unit, to output the second PWM signal to the cooling fan, thereby controlling the speed of the cooling fan.

3. The control circuit of claim 2, wherein a duty cycle of the second PWM signal is defined by charge time and discharge time of the capacitor.

4. The control circuit of claim 2, wherein the switch unit comprises a switcher and fifth to seventh resistors, a first input pin of the switcher is coupled to the output pin of the timer for receiving the second PWM signal, a second input pin of the switcher is coupled to a signal output pin of the controller for receiving the first PWM signal, a ground pin of the switcher is grounded, a power pin of the switcher is coupled to a second standby power supply, a selection pin of the switcher is coupled to the system power supply through the fifth resistor and is grounded through the sixth resistor, an output pin of the switcher is coupled to the second standby power supply through the seventh resistor and coupled to the control pin of the cooling fan.

5. A control circuit comprising:
   a cooling fan configured to cooling a data center;
   a power supply unit;
   a first pulse width modulation (PWM) signal generated by a controller and configured to control the cooling fan to rotate at a first speed;
   a second PWM signal generated by a control unit and configured to control the cooling fan to rotate at a second speed, which is less than the first speed; and
   a switch unit coupled between the controller and the cooling fan and coupled between the control unit and the cooling fan, the switch unit is configured to output the first PWM signal to the cooling fan when the data center is in an active mode and output the second PWM signal to the cooling fan when the data center is in a standby mode;
   wherein the power supply unit is coupled to a power pin of the cooling fan, the power supply unit is also coupled to a first standby power supply and a system power supply, the system power supply is configured to supply power to the cooling fan through the power supply unit when the data center is in an active mode, and the first standby power supply is configured to supply power to the cooling fan through the power supply unit when the data center is in a standby mode.

6. The control circuit of claim 5, wherein the control unit comprises a timer, first to fourth resistors, and a capacitor, a power pin of the timer is coupled to the first standby power supply, a discharge pin of the timer is coupled the first standby power supply through the first resistor, a trigger pin and a threshold pin of the timer are coupled the discharge pin of the timer through the second resistor, the threshold pin of the timer is grounded through the capacitor, a ground pin of the timer is grounded, a reset pin of the timer is coupled to the first standby power supply through the third resistor, an output pin of the timer is coupled to the first standby power supply through the fourth resistor, the output pin of the timer is also coupled to a control pin of the cooling fan through the switch unit, to output the second PWM signal to the cooling fan, thereby controlling the speed of the cooling fan.

7. The control circuit of claim 6, wherein a duty cycle of the second PWM signal is defined by charge time and discharge time of the capacitor.

8. The control circuit of claim 6, wherein the switch unit comprises a switcher and fifth to seventh resistors, a first input pin of the switcher is coupled to the output pin of the timer for receiving the second PWM signal, a second input pin of the switcher is coupled to a signal output pin of the controller for receiving the first PWM signal, a ground pin of the switcher is grounded, a power pin of the switcher is coupled to a second standby power supply, a selection pin of the switcher is coupled to the system power supply through the fifth resistor and is grounded through the sixth resistor, an output pin of the switcher is coupled to the second standby power supply through the seventh resistor and coupled to the control pin of the cooling fan.

* * * * *